March 24, 1925.  1,530,956
H. C. REED
TRACTION INCREASING ATTACHMENT FOR VEHICLE DISK WHEELS
Filed April 1, 1924

Inventor
H. C. Reed
By Clarence A. O'Brien
Attorney

Patented Mar. 24, 1925.

1,530,956

UNITED STATES PATENT OFFICE.

HARRY C. REED, OF KIRON, IOWA.

TRACTION-INCREASING ATTACHMENT FOR VEHICLE DISK WHEELS.

Application filed April 1, 1924. Serial No. 703,430.

*To all whom it may concern:*

Be it known that I, HARRY C. REED, citizen of the United States, residing at Kiron, in the county of Crawford and State of Iowa, have invented certain new and useful Improvements in a Traction-Increasing Attachment for Vehicle Disk Wheels, of which the following is a specification.

This invention relates to new and useful improvements in traction increasing devices and more particularly to a device which is especially adapted for use upon vehicle disk wheels.

A further object of the invention is to provide a device of the above mentioned character, wherein a number of traction increasing cross chains are removably supported in position over the tread portion of a pneumatic tire mounted on a disk wheel, the means for attaching the chains in an operative position being further adapted to rotate with the wheels.

A still further object of the invention is to provide a disk wheel attachment of the above mentioned character, which may be easily and conveniently secured in an operative position on a disk wheel and will obviate the necessity of having to jack up the wheel in order to place the chains in position thereon as is now necessary.

A further object of the invention is to provide a device of the above mentioned character, which is simple in construction, inexpensive, strong and durable and furthermore adapted for the purpose for which it is designed.

Other objects and advantages of this invention will become apparent during the course of the following description.

Figure 1:
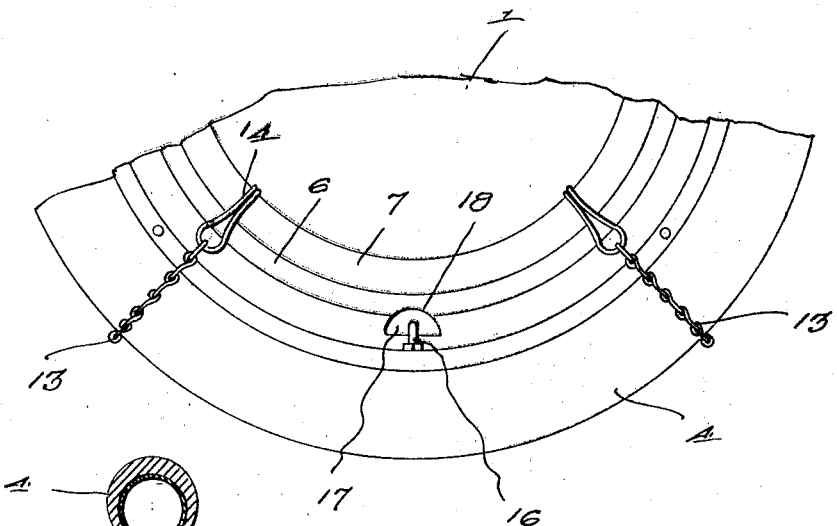
Figure 2:
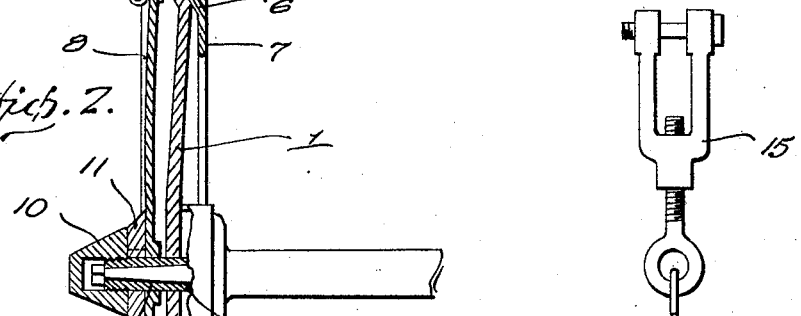
Figures 3, 4:
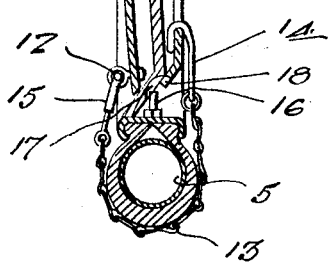

In the accompanying drawings forming a part of this specification and in which like numerals designate like parts throughout the same, Figure 1 is a fragmentary side elevation of the rear portion of a disk wheel showing the manner in which the cross chains are attached thereto, Figure 2 is a central vertical section through a disk wheel and the supporting axle therefor, showing my invention in position thereon, Figure 3 is a detail view of the attaching means for one end of the cross chain, and Figure 4 is a sectional view showing the manner in which the washer is supported on the bushing.

In the drawing wherein for the purpose of illustration is shown the preferred embodiment of my invention, the numeral 1 designates the disk portion of the wheel which is of any well known construction and is supported on the outer end of the axle 2 in the usual manner. The outer peripheral edge of the disk wheel carries thereon the usual rim 3 and supported thereon is the pneumatic tire 4 in which is carried the usual inner tube 5. Secured to the inner face of the disk 1 adjacent the outer edge thereof is the annular ring 6, and the latter is provided with an annular inwardly extending flange 7 which is slightly spaced from the disk 1 in the manner clearly shown in Figure 2 of the drawing and for the purpose hereinafter to be more fully described.

Arranged on the outer face of the disk 1 and adapted to rotate therewith is the circular plate 8, the same being keyed together with the disk 1 on the bushing 9 which extends around the outer end of the axle 2 in the manner clearly shown and a suitable hub cap 10 is threaded onto the threaded end of the bushing into engagement with the washer 11 whereby the plate 8 and the disk 1 will be supported in proper position on the axle. The outer edge of the circular plate 8 extends adjacent the rim 3 and this is also clearly illustrated in Figure 2.

Removably supported in the circular plate 8 adjacent the outer edges thereof and arranged in proper spaced relation are the eye bolts 12. Any number of these eye bolts may be provided as is necessary and the same are adapted to extend on the outer face of the plate. The traction increasing means comprises a plurality of cross chains such as are shown at 13 in the drawing. Each chain is adapted to extend around the tire casing 4 and one end of the chain is connected to a suitable hook 14 which engages the annular flange 7 formed on the ring 6 on the inside of the disk 1 while the opposite end of the chain is secured to an adjustable clevis 15, the construction of which is more clearly illustrated in Figure 3 in the drawing. The clevis is adapted to be detachably secured to the eye bolts 12 and when in the position as shown in Figure 2 of the drawing, the cross chain will be securely supported around the tire casing against accidental displacement therefrom. Any number of these cross chains may be placed around the tire casing and secured to the ring and plate respectively in the manner as above described and by providing a construction of the above mentioned character, considerable time and labor will be saved in placing the cross chains in position on the wheel.

For the purpose of rendering the inflating valve 16 accessible, I provide the disk 1 with a cut out portion 17 and the adjacent portion of the ring 6 is also provided with a cut out portion 18 directly over the inflating valve 16 which extends through the rim 3 in the manner clearly shown in the drawing.

A disk wheel attachment of the above mentioned character, enables any number of cross chains to be readily placed in position thereon without having to jack up the wheels and furthermore the cross chains will be securely supported in position around the tread or casing of the tire against accidental displacement therefrom, thus assuring the efficient operation of the traction increasing member whenever necessary. By further providing a traction increasing chain attachment of the above mentioned character wherein a plate and ring are used to connect the ends of the chain, the same will rotate with the wheel and thus evenly distribute the wear on the tire casing, and if desired the chains may be tightened around the tire casing by tightening the hub cap 10 and forcing the plate 8 inwardly against the disk 1. The simplicity in which my device is constructed enables the same to be manufactured at a very low cost and may be readily placed upon disk wheels of the type well known in the art and will not interfere with the construction or operation of the same.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. In combination with a vehicle disk wheel and the supporting axle therefor, an annular ring carried by the inner side thereof, an annular flange extending inwardly from said ring and spaced from said disk, a circular plate arranged on the outer side of said disk, said plate keyed to said disk and adapted to rotate therewith, a plurality of eye bolts carried by said circular plate and extending outwardly therefrom, cross chains adapted to extend around the tread of said wheel, an adjustable clevis carried by one end of each of the cross chains and adapted to be detachably connected to one of said eye bolts, the opposite end of each of said chains having a hook carried thereon for engagement with the annular flange formed on said ring.

2. In combination with a vehicle disk wheel and the supporting axle therefor, an annular ring carried by the inner side thereof, an annular flange extending inwardly from said ring and spaced from said disk, a circular plate arranged on the outer side of said disk, said plate keyed to said disk and adapted to rotate therewith, a plurality of eye bolts carried by said circular plate and extending outwardly therefrom, cross chains adapted to extend around the tread of said wheel, an adjustable clevis carried by one end of each of the cross chains and adapted to be detachably connected to one of said eye bolts, the opposite end of each of said chains having a hook carried thereon for engagement with the annular flange formed on said ring, and means associated with said axle and said circular plate for moving the same inwardly toward the said disk to tighten said cross chain.

In testimony whereof I affix my signature.

HARRY C. REED.